United States Patent [19]

Prescott

[11] 4,070,000
[45] Jan. 24, 1978

[54] FLUID OPERATED VALVE
[75] Inventor: Norman F. Prescott, Wenham, Mass.
[73] Assignee: Atwood & Morrill Co., Salem, Mass.
[21] Appl. No.: 713,209
[22] Filed: Aug. 9, 1976

Related U.S. Application Data
[63] Continuation of Ser. No. 504,926, Sept. 11, 1974, abandoned.

[51] Int. Cl.² .......................................... F16K 31/122
[52] U.S. Cl. ......................................... 251/26; 251/28
[58] Field of Search .............................. 251/26, 28, 29
[56] References Cited
U.S. PATENT DOCUMENTS

| 1,725,011 | 8/1929 | Menz | 251/29 |
| 2,206,957 | 7/1940 | Hose | 251/26 |
| 2,758,811 | 8/1956 | Peterson | 251/29 |
| 2,788,019 | 4/1957 | Mottram | 251/28 X |
| 2,840,104 | 6/1958 | Shafer | 251/29 X |
| 3,075,737 | 1/1963 | Cantalupo et al. | 251/26 |
| 3,136,333 | 6/1964 | Griswold | 251/29 X |
| 3,533,434 | 10/1970 | Smith | 251/26 X |

Primary Examiner—Arnold Rosenthal
Attorney, Agent, or Firm—Marvin A. Naigur; John E. Wilson

[57] ABSTRACT

A fluid operated valve in which the fluid from the line in which the valve is placed is used to aid in the opening and closing of said valve. A shuttle valve communicating with both the inlet and outlet chambers of the valve is operable to permit one of said chambers containing fluid under pressure to communicate with an auxiliary chamber in the valve to provide a closing force for the valve.

4 Claims, 2 Drawing Figures

FLUID OPERATED VALVE

REFERENCE TO RELATED APPLICATION

This is a continuation of U.S. patent application Ser. No. 504,926, filed on Sept. 11, 1974 now abandoned.

BACKGROUND OF THE INVENTION

There are many uses in industry for valves in which the pressure differential across the main closure member is controlled in one way or another to aid in the closing and/or opening of the valve. An example is found in so-called balanced valves in which the main closure member is partially positioned within an auxiliary chamber which is pressurized with fluid under substantially the same pressure as the fluid in the line so that the closure member can be moved to close the valve without moving it across a large pressure differential.

Such valves are usually closed by large springs or some other suitable source of energy.

There are several disadvantages to such a design. For one, if the valve is large, a large force must be made available to close the valve even if it is a balanced valve. Further, the availability of pressurized fluid to aid in the closing of a valve of the balanced design is a problem when the line in which the valve is placed fails on a side thereof from which fluid is taken to pressurize the auxiliary chamber.

One way to provide a closing force is to design the valve so that fluid under pressure can be provided for the auxiliary chamber from either side of the valve. This requires an additional system of control valves which is expensive and, because of the additional critical components, unreliable unless maintained rigorously.

In large valves, the use of line pressure as a source of energy to supply a closing force for a valve is necessitated by the impracticability of providing power sources separate from the line pressure, which can exert a force greater than that exerted by the fluid in the line. Thus, even with the disadvantages pointed out above, line pressure has been used to exert the energy to close large valves.

SUMMARY OF THE INVENTION

It is an object of the present invention to overcome drawbacks such as those found in the prior art and discussed above. Accordingly, a fluid operating valve is provided with an auxiliary chamber in which a portion of the main closure member is slidably engaged, a control valve operable to vent the auxiliary chamber to the atmosphere or to place it in fluid communication with a shuttle valve which is placed in communication with the inlet and outlet chambers of the valve so that the control valve can be actuated to vent the auxiliary chamber to the atmosphere and allow the main closure member to open, or to place the auxiliary chamber in communication with the shuttle valve which is operable under fluid pressure from the inlet chamber or outlet chamber to supply fluid under pressure to said auxiliary chamber to exert a force to close said valve.

DETAILED DESCRIPTION OF THE PREFERRED EMBODIMENT

Figure 1:
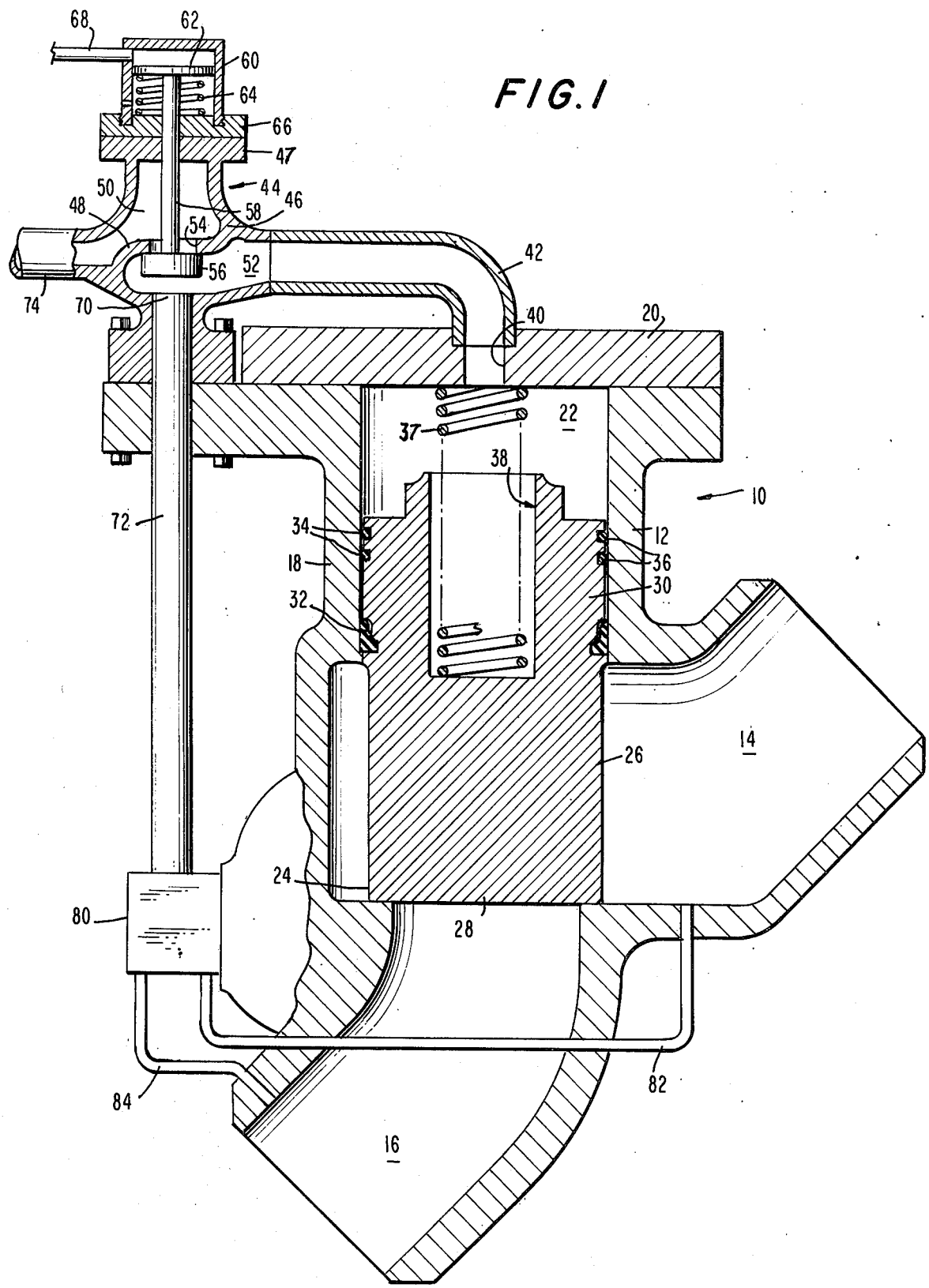
FIG. 1 is a view, partly in section, showing a preferred embodiment of the present invention.

FIG. 1 shows a fluid operated valve indicated generally as 10 having a casing 12, which includes an inlet chamber and a coaxial, axially spaced outlet chamber 16. The inlet chamber 14 and the outlet chamber 16 are ordinarily connected to piping not shown so that the valve 10 is in a line which carries a fluid, such as steam under pressure. The casing also includes a cylindrical section 18 which projects upwardly to a cylinder head 20, which is bolted to the cylindrical section 18, and which, with the cylindrical section 18, defines an auxiliary chamber 22. The auxiliary chamber 22 extends at an angle to the inlet and outlet chambers 14 and 16.

The fluid operated valve 10 includes a main valve seat 24 which is annular and which separates the inlet chamber 14 from the outlet chamber 16.

A main closure member in the form of a piston 26 is dimensioned at its lower portion 28 to seat against the main valve seat 24 to close the fluid operated valve 10. The piston 26 has an upper portion 30 which is slidably positioned within the auxiliary chamber 22. The upper portion 30 is of a diameter slightly greater than that of the main valve seat 24 so that the area of the upper portion 30 of the piston 26 is greater than that of the seat 24. The upper portion 30 of the piston 26 includes a sealing ring 32 which may be of the type shown and claimed in U.S. Pat. No. 3,842,717, that is, it is designed so that it will provide an effective seal for operation of the valve when closed and with pressure greater in the outlet chamber 16 than the inlet chamber 14. In other words, the sealing ring is supplied to minimize leakage of valve for reverse flow direction, but like most seals will have some leakage during normal operation so that the pressure within the auxiliary chamber 22 is substantially the same as the line pressure.

The cylindrical portion 30 also includes piston rings 34 which are positioned within grooves 36 in the surface of the cylindrical portion 30 above the sealing ring 32. During normal operation when the valve is open, leakage past sealing ring 32 and piston rings 34 will pressurize the auxiliary chamber 22. The piston rings 34 control leakage during valve opening when chamber 22 is evacuated in a manner explained below.

A coil spring 37 extends from the bottom of the cylinder head 20 down into a large cylindrical recession 38 at the top of the piston 26. The recession 38 is centrally located with respect to the piston 26 and is deep enough to hold the coil spring 37 in a generally vertical position no matter what the elevation of the piston 26. The coil spring 37 urges the piston 26 downward so that the bottom 28 thereof engages against the main valve seat 24.

The cylinder head 20 is bored at 40 to permit the auxiliary chamber 22 to communicate with a fluid line 42 which connects the auxiliary chamber 22 with a control valve 44. In the open position, piston 26 seats on the under side of the cylinder head 20 and shuts off leakage to the atmosphere.

The control valve 44 has a casing 46 with an interior wall 48 which divides the interior of the control valve 44 into an exhaust chamber 50 and a flow chamber 52. Extending through the interior wall is a valve port 54 which permits communication between the exhaust chamber 50 and the flow chamber 52 when it is uncovered. The valve port 54 may be covered by a control valve poppet 56 which is mounted at the bottom of a valve stem 58 which extends upward through the top of the casing 47 to an air cylinder 60 in which is slidably mounted a piston 62 which is secured to the top of the valve stem 58. The piston 62 is urged upwardly by a coil spring 64 positioned between the piston 62 and the bottom 66 of the air cylinder 60. An air line 68 extends into the air cylinder 60 above the piston 62 so that when air is fed under pressure to the line 68, the piston 62 will be urged downward until the control valve poppet 56 covers a lower valve port 70 in the casing 47 below the interior wall 48. Extending through the casing 47 is a fluid line 72 which connects with the valve port 70 to communicate with the flow chamber 52. An exhaust line 74 extends through the casing 47 from the exhaust chamber 50 to the atmosphere.

The fluid line 72 extends down to a shuttle valve 80. The shuttle valve 80 is connected by steam lines 82 and 84 to the inlet chamber 14 and the outlet chamber 16, respectively. The control valve 44 and the shuttle valve 80 and their communicating fluid line 72 are shown best, perhaps, in FIG. 2. The shuttle valve 80 has a valve body 86 in which is a valve chamber 88. The chamber 88 is generally cylindrical and a generally cylindrical shuttle element 90 is positioned within the shuttle valve chamber 88. The shuttle element 90 is of an outside diameter which is slightly less than the inside diameter of the shuttle valve chamber 88 so that the shuttle valve can slide axially within the shuttle valve member 88. One end of the shuttle valve chamber 88 communicates with the line 82 through a channel 92 which is of a diameter substantially less than the shuttle valve chamber 88 and which extends axially from the one end of that chamber.

The other end of the shuttle valve chamber 88 communicates with the line 84 through a channel 94 which is also of a substantially smaller diameter than the chamber 88.

The fluid line 72 connects with the shuttle valve 80 between the channels 92 and 94 through a channel 96 which opens into the center of the chamber 88.

In operation, when it is desired to open the valve from a closed position, as shown in FIG. 1, compressed air is admitted through the air line 68 into the air cylinder 60 above the piston 62. This moves the piston 62 downward compressing a spring 64 and moving the control valve poppet 56 to cover the lower valve port 70 so that it no longer covers the upper valve port 54. This allows fluid to move out of the chamber 22 through the line 42 and the valve 44 to the exhaust line 74 so that it will be vented to the atmosphere.

Since pressure is equalized above and below the piston 26 by the normal leakage through the sealing ring 32 and the piston rings 34 during operation, the pressure in the auxiliary chamber 22 drops from a pressure substantially equal to the line pressure to atmospheric pressure. The sudden release of pressure in the auxiliary chamber 22 will cause the piston 26 to immediately move upwardly due to the pressure acting upward. This pressure is initially that of the outlet chamber 16 or inlet chamber 14 whichever is higher and positions the shuttle valve 80 but as soon as the piston 26 is unseated, it is the pressure of the fluid moving around and under the piston 26. The spring 37 has a spring constant low enough that it will not exert a downward force as great as the upward force exerted by line pressure on the piston 26. Thus, the valve is opened.

When it is desired to close the valve, the compressed air above the piston 62 is released so that the coil spring 64 will move the piston 62 upward. This moves the valve stem 58 and the control valve poppet 56 upward to seat and close off the upper valve port 54. Thus, commmunication between the chamber 22 and the atmosphere is prevented, but the chamber 22 is placed in communication with the shuttle valve 80. The shuttle valve 80 will function to place fluid from either the inlet chamber 14 or the outlet chamber 16 into the auxiliary chamber 22 through the fluid line 72 and the line 42. If pressure at the inlet chamber 14 is greater than the pressure in the outlet chamber 16, steam from the inlet chamber 14 will push the shuttle valve element 90 to the position shown in FIG. 2. This would prevent flow of fluid from the inlet chamber 14 to the outlet chamber 16 through the control valve 80 but would allow steam from the inlet chamber 14 to flow under pressure through the channel 92, the control valve chamber 88, the fluid line 72 and then through the control valve 80 through the fluid line 42. Pressurization of the auxiliary chamber 22 will cause the piston 26 to be pushed down to seat down at the bottom portion 28 on the main valve seat 24.

Figure 2:
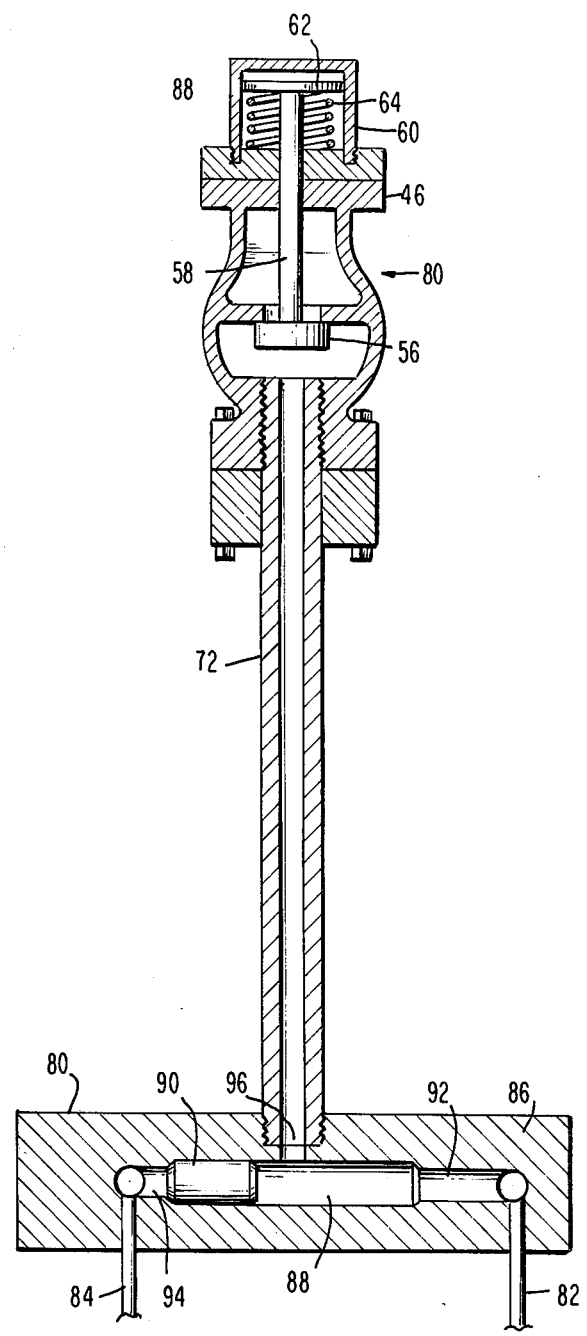
FIG. 2 is a view, partly in section, of the shuttle and control valves and connecting fluid lines of the present invention.

In the event that pressure is greater in the outlet chamber 16 than in the inlet chamber 14, the shuttle element will move to the right side as seen in FIG. 2 to prevent flow from the line 84 to the line 82 through the shuttle valve 80. It will permit flow from the outlet chamber 16 through the shuttle valve 80 to the fluid line 72 and flow chamber 52 of the control valve 44, and the fluid line 42 into the auxiliary chamber 22 to drive down the piston 26 on to the valve seat 24. It should be noted that the cylindrical portion 30 is of a greater diameter than is the bottom portion 28. Thus, if it is necessary to use steam pressure from the outlet chamber 16 to close the present valve 10, it will be possible because the effective area is greater for the steam within the auxiliary chamber than for the steam within the outlet chamber 16. Consequently, the force exerted downward by the steam in the auxiliary chamber will be greater than the force exerted upward in the outlet chamber even though the pressures are the same in the auxiliary chamber and in the outlet chamber.

The foregoing describes but one preferred embodiment of the present invention, other embodiments being possible without exceeding the scope of the present invention as defined in the following claims.

What is claimed is:

1. A fluid operated valve comprising:
an inlet chamber;
an outlet chamber;
a main valve seat separating said inlet chamber and said outlet chamber;
an auxiliary cylindrical chamber above and coaxial with said main valve seat;
a main piston, the upper portion of said piston being movable, positioned within said auxiliary chamber, said main piston having a lower portion adapted to seat on said main valve seat and being of a smaller diameter than said upper portion so that the top of said main piston has a greater effective area than the area defined by said main valve seat;
a shuttle valve comprising:
a shuttle valve chamber, one end of said shuttle valve chamber being in fluid communication with said inlet chamber, the other end of said shuttle chamber being in fluid communication with said outlet chamber, a shuttle element slidably positioned within said shuttle valve chamber preventing pressure equalization between said inlet chamber and said outlet chamber and movable by fluid pressure within said shuttle valve chamber;

a first fluid line, free of any means capable of obstructing flow, connected to said shuttle valve chamber at a location between said one end and said other end of said shuttle valve chamber;

a second fluid line, free of any means capable of obstructing flow, connected with said auxiliary chamber above said piston;

a control valve connected to said first fluid line and said second fluid line, and having a flow chamber connected between said first line and said second fluid line, a first valve seat between said flow chamber and said one fluid line, and a second valve seat coaxial with said first valve seat in communication with the atmosphere, a control valve closure member movable to seat selectively against said first valve seat and said second valve seat; a control valve air chamber, a control valve piston within said control valve air chamber, a valve stem connected to said control valve piston and to said control valve closure member, a compression spring urging said control valve closure member into engagement with said second valve seat:

whereby when air pressure within said control valve air chamber urging said control valve piston against said compression spring is released, said control valve piston will be moved by said compression spring to cover said first valve seat to vent said auxiliary chamber to the atmosphere and said control valve air chamber can be pressurized to actuate said control valve piston to cover said second valve seat and uncover said first valve seat and thereby place said auxiliary chamber in communication with said shuttle valve through said one fluid line so that when said piston is seated on said main seat and said control valve is actuated to vent said auxiliary chamber to the atmosphere, the pressure of fluid on said main piston will cause said main piston to unseat and whereby when said control valve is actuated to place said auxiliary chamber in communication with said shuttle valve at a time when said inlet chamber contains fluid at a pressure greater than the pressure of fluid in said outlet chamber, said shuttle member will be moved by pressure from said inlet chamber to said other end of said shuttle valve chamber to prevent pressure equalization between said inlet chamber and said outlet chamber but to allow communication between said inlet chamber and said one fluid line and whereby when said control valve is actuated to place said auxiliary chamber in communication with said shuttle valve at a time when said outlet chamber contains fluid at a pressure greater than the fluid in said inlet chamber, fluid under pressure from said outlet chamber will move said element to said one end of said shuttle valve chamber to prevent communication between said shuttle valve chamber and said inlet chamber but allow communication between said outlet chamber and said one fluid line so that fluid will flow through said one fluid line to said auxiliary chamber to move said main piston onto said valve seat to shut said valve.

2. The fluid operated valve defined in claim 1 wherein said shuttle valve chamber is generally cylindrical and said shuttle valve element is generally cylindrical and axially slidable within said shuttle valve chamber.

3. The fluid operated valve defined in claim 1 wherein said control valve air chamber is divided into two portions by said control valve piston and wherein said compression spring is in the portion of said control valve air chamber other than the portion in communication with said air line to move said piston against the pressure in said control valve air cylinder.

4. The fluid operated valve defined in claim 3 further comprising a cylinder head, said cylinder head closing the top of said auxiliary cylinder, and a compression spring positioned between said main piston and said cylinder head.

* * * * *